(12) United States Patent
Huang et al.

(10) Patent No.: US 11,496,562 B1
(45) Date of Patent: Nov. 8, 2022

(54) METHOD AND SYSTEM FOR ACCESSING DIGITAL OBJECT IN HUMAN-CYBER-PHYSICAL ENVIRONMENT

(71) Applicant: PEKING UNIVERSITY, Beijing (CN)

(72) Inventors: Gang Huang, Beijing (CN); Chaoran Luo, Beijing (CN); Yun Ma, Beijing (CN); Ying Zhang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/752,792

(22) Filed: May 24, 2022

(30) Foreign Application Priority Data

Oct. 13, 2021 (CN) .......................... 202111194110.2

(51) Int. Cl.
| | |
|---|---|
| *H04L 67/1061* | (2022.01) |
| *H04L 45/02* | (2022.01) |
| *H04L 67/1095* | (2022.01) |

(52) U.S. Cl.
CPC .......... *H04L 67/1065* (2013.01); *H04L 45/02* (2013.01); *H04L 67/1095* (2013.01)

(58) Field of Classification Search
None
See application file for complete search history.

(56) References Cited

U.S. PATENT DOCUMENTS

| | | | | |
|---|---|---|---|---|
| 2006/0047646 A1* | 3/2006 | Maluf | ................. | G06F 16/8358 |
| 2010/0228781 A1* | 9/2010 | Fowler | ................... | G06T 11/40 |
| | | | | 707/791 |
| 2011/0069714 A1* | 3/2011 | Le Pennec | ............. | H04L 45/00 |
| | | | | 370/401 |
| 2011/0106811 A1* | 5/2011 | Novoselsky | ........... | G06F 16/81 |
| | | | | 707/E17.123 |
| 2011/0302198 A1* | 12/2011 | Baby | ................... | G06F 16/2465 |
| | | | | 707/769 |

(Continued)

FOREIGN PATENT DOCUMENTS

| | | | | |
|---|---|---|---|---|
| CN | 101242365 A | | 8/2008 | |
| CN | 111683014 A | * | 9/2020 | ............. H04L 45/54 |

(Continued)

OTHER PUBLICATIONS

Makoto Yuri, et al., BSP search method under P2P environment, Forum on Information Technology, 2008, pp. 241-242.

*Primary Examiner* — Uzma Alam
(74) *Attorney, Agent, or Firm* — Bayramoglu Law Offices LLC

(57) ABSTRACT

A method and system for accessing a digital object in a Human-Cyber-Physical environment are provided. A P2P network is established based on a distributed hash table (DHT); a Kademlia algorithm is used to establish a forward routing table corresponding to each node; and an index binary tree is established according to a logical distance between each node in the forward routing table and a target node. In a process of transmitting a message from a node of a storage digital object to a root node, all nodes that the message passes establish backward routing tables for the digital object, so that in a data query stage, target data may be found from any node through the forward routing table and the backward routing table, and a data identifier of a data entity in the DHT-based P2P network from a storage location of the data identifier may be decoupled.

10 Claims, 4 Drawing Sheets

(a) Identifier transmission in a storage process (b) Digital object retrieval flow

(56) References Cited

U.S. PATENT DOCUMENTS

2015/0117462 A1* 4/2015 Brandt ................ H04W 12/033
370/392

FOREIGN PATENT DOCUMENTS

| CN | 112039775 A | 12/2020 |
|---|---|---|
| JP | 2011070607 A | 4/2011 |
| JP | 2011175448 A | 9/2011 |
| WO | 9605704 A2 | 2/1996 |

* cited by examiner

```
┌─────────────────────────────────────────────────────────────────┐
│ Establishing a P2P network is established on the basis of a DHT,│
│ wherein each node in the P2P network includes a node identifier │──S101
│ corresponding to each of the nodes; using a Kademlia algorithm  │
│ to establish a forward routing table corresponding to each of   │
│ the nodes according to the node identifier                      │
└─────────────────────────────────────────────────────────────────┘
                                │
                                ▼
┌─────────────────────────────────────────────────────────────────┐
│ Regarding any node in the P2P network as a target node,         │
│ calculating a logical distance between each node in the forward │
│ routing table corresponding to the target node and the target   │──S102
│ node, and establishing an index binary tree according to the    │
│ logical distance between each of the nodes and the target node  │
└─────────────────────────────────────────────────────────────────┘
                                │
                                ▼
┌─────────────────────────────────────────────────────────────────┐
│ When any node in the index binary tree obtains a data entity    │──S103
│ of a digital object, the node is determined as an adjacent      │
│ repository node                                                 │
└─────────────────────────────────────────────────────────────────┘
                                │
                                ▼
┌─────────────────────────────────────────────────────────────────┐
│ Generating a first data identifier for the data entity by the   │
│ adjacent repository node, and transmitting the first data       │
│ identifier to a parent node of the adjacent repository node in  │──S104
│ turn until the first data identifier reaches a root node of the │
│ index binary tree, so as to enable the parent node and the root │
│ node to establish a backward routing table comprising the first │
│ data identifier                                                 │
└─────────────────────────────────────────────────────────────────┘
                                │
                                ▼
┌─────────────────────────────────────────────────────────────────┐
│ When any node in the index binary tree obtains a query request  │──S105
│ for the data entity, determining the node as a query start node │
└─────────────────────────────────────────────────────────────────┘
                                │
                                ▼
┌─────────────────────────────────────────────────────────────────┐
│ When no backward routing table is stored in the query start     │
│ node, forwarding the query request to the parent node of the    │
│ query start node in the index binary tree in turn until the     │──S106
│ query request reaches a parent node or a root node comprising   │
│ the backward routing table with the first data identifier       │
│ according to the forward routing table                          │
└─────────────────────────────────────────────────────────────────┘
                                │
                                ▼
┌─────────────────────────────────────────────────────────────────┐
│ Forwarding the query request to the adjacent repository node by │
│ the parent node comprising the backward routing table with the  │──S107
│ first data identifier, or by the root node according to the     │
│ backward routing table                                          │
└─────────────────────────────────────────────────────────────────┘
                                │
                                ▼
┌─────────────────────────────────────────────────────────────────┐
│ Returning current status information of the data entity to the  │──S108
│ query start node according to the query request by the adjacent │
│ repository node                                                 │
└─────────────────────────────────────────────────────────────────┘
```

FIG. 2

METHOD AND SYSTEM FOR ACCESSING DIGITAL OBJECT IN HUMAN-CYBER-PHYSICAL ENVIRONMENT

CROSS REFERENCE TO THE RELATED APPLICATIONS

This application is based upon and claims priority to Chinese Patent Application No. 202111194110.2 filed on Oct. 13, 2021, the entire contents of which are incorporated herein by reference.

TECHNICAL FIELD

The present application relates to the technical field of communications, and more particularly, to a method and system for accessing a digital object in a human-cyber-physical environment.

BACKGROUND

Digital Object Architecture (DOA) is a software architecture proposed by Professor Robert Elliot Kahn, the Turing Award winner and the father of the Internet, which is a digital object centric to solve the interoperability between information system resources in an open environment. The DOA abstracts a resource as a digital object and models it into three parts: description information, status information, and a data entity, so as to shield the heterogeneity of the resource. An interoperation with the resource is modeled into three steps: searching, resolving, and accessing, so as to reduce the complexity of the interoperation. Digital objects are essentially the data abstraction of resource entities. The resource entities in an Internet environment are mainly data resources such as files and database tables in the information system. The existing DOA implements an access service to data resources on the Internet.

The human-cyber-physical environment refers to a new environment in which boundaries between a human society, a physical world, and an information system are gradually blurred and integrated. Resources in the human-cyber-physical environment mainly represent humans and things. Using human-cyber-physical digital objects to abstract human-cyber-physical resources may shield the diverse and heterogeneous characteristics of human and thing entities.

Although a physical location of a cloud server in the Internet environment is not completely centralized, the cloud server may provide stable digital object access services in an information space due to its rich computing and network resources, so as to shield the scattering of the physical location. However, in the human-cyber-physical environment, the human and things are spatialized, which cannot be replicated, and their mobility is restricted by the real world. Data entities of humans and things are mostly generated, stored, and consumed in terminal devices, and the terminal devices are extremely scattered in physical and network spaces. How to access these digital objects in a scattered space is a problem urgently to be solved by the DOA in the human-cyber-physical environment.

SUMMARY

The present application provides a method and system for accessing a digital object in a human-cyber-physical environment, so as to solve the problem that digital objects in a scattered space may not be accessed in real time in the human-cyber-physical environment.

In order to solve the above problem, the present application adopts the following technical solution:

In a first aspect, an embodiment of the present application provides a method for accessing a digital object in a human-cyber-physical environment, the method including:

establishing a peer to peer (P2P) network on the basis of a distributed hash table (DHT), wherein each node in the P2P network comprises a node identifier corresponding to each of the nodes; using a Kademlia algorithm to establish a forward routing table corresponding to each of the nodes according to the node identifier;

regarding any node in the P2P network as a target node, calculating a logical distance between each node in the forward routing table corresponding to the target node and the target node, and establishing an index binary tree according to the logical distance between each of the nodes and the target node;

when any node in the index binary tree obtains a data entity of a digital object, determining the node as an adjacent repository node, generating a first data identifier for the data entity by the adjacent repository node, and transmitting the first data identifier to a parent node of the adjacent repository node in turn until the first data identifier reaches a root node of the index binary tree, so as to enable the parent node and the root node to establish a backward routing table comprising the first data identifier;

when any node in the index binary tree obtains a query request for the data entity, determining the node as a query start node;

when no backward routing table is stored in the query start node, forwarding the query request to the superior farther node of the query start node in the index binary tree in turn until the query request reaches a farther node or a root node comprising the backward routing table with the first data identifier according to the forward routing table;

forwarding the query request to the adjacent repository node by the parent node comprising the backward routing table with the first data identifier, or by the root node according to the backward routing table; and returning current status information of the data entity to the query start node according to the query request by the adjacent repository node.

In one embodiment of the present application, the step of calculating, regarding any node in the P2P network as a target node, calculating a logical distance between each node in the forward routing table corresponding to the target node and the target node includes:

using the following exclusive OR (XOR) calculation formula to calculate a logical distance between each node in the forward routing table corresponding to the target node and the target node:

$$d(\text{node1}, \text{node2}) = ID_{node1} \oplus ID_{node2};$$

where node1 is the target node; $ID_{node1}$ is a node identifier of the target node; node2 is any node in the forward routing table; $ID_{node2}$ is a node identifier of any node in the forward routing table; and d(node1, node2) is the logical distance between the target node and the any node in the forward routing table.

In one embodiment of the present application, the step of establishing an index binary tree according to the logical distance between each of the nodes and the target node includes:

storing tree nodes of an ith layer of the index binary tree which are spaced apart from the target node at the logical distances in a range of $[2^{i-1}, 2^i)$ in an ascending or descending order according to the logical distance between each node and the target node, where i is a positive integer.

In one embodiment of the present application, the step of generating a first data identifier for the data entity by the adjacent repository node, and transmitting the first data identifier to a parent node of the adjacent repository node in turn until the first data identifier reaches a root node of the index binary tree, so as to enable the parent node and the root node to establish a backward routing table comprising the first data identifier includes:

generating a backward routing table by the adjacent repository node based on a bloom filter, the backward routing table comprising a ternary routing group <$ID_{node}$, Address, Set[BF Vector]>, where $ID_{node}$ is a node identifier of the adjacent repository node; Address is a network address of the adjacent repository node; and Set[BF Vector] is a data identifier set comprised in the adjacent repository node;

generating a first data identifier of the data entity by the adjacent repository node, writing the first data identifier into the Set[BF Vector] of the adjacent repository node, and transmitting the first data identifier to a parent node;

determining whether the parent node comprises a backward routing table pointing to the adjacent repository node when the parent node obtains the first data identifier;

if the parent node comprises the backward routing table pointing to the adjacent repository node, writing the first data identifier into the Set[BF Vector] of the farther node by the parent node, and transmitting the first data identifier to a next parent node of the parent node until the first data identifier reaches a root node of the index binary tree, so as to enable the parent node and the root node to establish a backward routing table comprising the first data identifier; and if the parent node does not comprise the backward routing table pointing to the adjacent repository node, writing the first data identifier into the Set[BF Vector] of the parent node by the ternary routing group of the parent node generated by the parent node based on the bloom filter, and transmitting the first data identifier to a next parent node of the parent node until the first data identifier reaches a root node of the index binary tree, so as to enable the parent node and the root node to establish a backward routing table comprising the first data identifier.

In one embodiment of the present application, the step of when no backward routing table is stored in the query start node, forwarding the query request to the superior farther node of the query start node in the index binary tree in turn until the query request reaches a farther node or a root node comprising the backward routing table with the first data identifier according to the forward routing table includes:

when no backward routing table is stored in the query start node, forwarding the query request to the superior farther node of the query start node in the index binary tree in turn according to the forward routing table, wherein the query request comprises the first data identifier and a node identifier of the query start node;

when the Set[BF Vector] in the parent node does not comprise the first data identifier, transmitting the query request to a next parent node until the query request reaches a parent node or a root node comprising the backward routing table with the first data identifier by the parent node.

In a second aspect, on the basis of the same inventive idea, an embodiment of the present application provides a system for accessing a digital object in a human-cyber-physical environment, the system including:

a P2P network establishing module is configured for, establishing a peer to peer (P2P) network on the basis of a distributed hash table (DHT), wherein each node in the P2P network comprises a node identifier corresponding to each of the nodes; using a Kademlia algorithm to establish a forward routing table corresponding to each of the nodes according to the node identifier;

an index binary tree establishing module is configured for, regarding any node in the P2P network as a target node, calculating a logical distance between each node in the forward routing table corresponding to the target node and the target node, and establishing an index binary tree according to the logical distance between each of the nodes and the target node;

a first determination module is configured for, when any node in the index binary tree obtains a data entity of a digital object, determining the node as an adjacent repository node;

a backward routing table establishing module configured in the adjacent repository node, wherein the backward routing table establishing module is configured for, generating a first data identifier for the data entity, and transmitting the first data identifier to a parent node of the adjacent repository node in turn until the first data identifier reaches a root node of the index binary tree, so as to enable the parent node and the root node to establish a backward routing table comprising the first data identifier;

a second determination module is configured for, when any node in the index binary tree obtains a query request for the data entity, determining the node as a query start node;

a forward query module configured in the query start node, wherein the forward query module is configured for, when no backward routing table is stored in the query start node, forwarding the query request to the superior farther node of the query start node in the index binary tree in turn until the query request reaches a farther node or a root node comprising the backward routing table with the first data identifier according to the forward routing table;

a backward query module configured in the parent node or the root node comprising the backward routing table with the first data identifier, wherein the backward query module is configured for, forwarding the query request to the adjacent repository node according to the backward routing table; and an information returning module configured in the adjacent repository node, wherein the information returning module is configured for, returning status information of the digital object returned by the adjacent repository node to the query request to the query start node.

In one embodiment of the present application, the index binary tree establishing module includes:

a distance calculation sub-module which uses the following XOR calculation formula to calculate a logical distance between each node in the forward routing table corresponding to the target node and the target node:

$$d(\text{node1},\text{node2})=ID_{node1} \oplus ID_{node2};$$

where node1 is the target node; $ID_{node1}$ is a node identifier of the target node; node2 is any node in the forward routing table; $ID_{node1}$ is a node identifier of any node in the forward routing table; and d(node1, node2) is the logical distance between the target node and the any node in the forward routing table.

In one embodiment of the present application, the index binary tree establishing module further includes:

a tree building sub-module is configured for, storing tree nodes of an ith layer of the index binary tree which are spaced apart from the target node at the logical distances in a range of $[2^{i-1}, 2^i)$ in an ascending or descending order according to the logical distance between each node and the target node, where i is a positive integer.

In one embodiment of the present application, the backward routing table establishing module includes:

a backward routing table generation sub-module configured in the adjacent repository node, wherein the backward routing table generation sub-module is configured for, generating a backward routing table by the adjacent repository node based on a bloom filter, the backward routing table comprising a ternary routing group <$ID_{node}$, Address, Set [BF Vector]>, where $ID_{node}$ is a node identifier of the adjacent repository node; Address is a network address of the adjacent repository node; and Set[BF Vector] is a data identifier set comprised in the adjacent repository node;

a first transmission sub-module configured in the adjacent repository node, wherein the first transmission sub-module is configured for, generating a first data identifier of the data entity by the adjacent repository node, writing the first data identifier into the Set[BF Vector] of the adjacent repository node, and transmitting the first data identifier to a parent node;

a determining sub-module is configured for, determining whether the parent node comprises a backward routing table pointing to the adjacent repository node when the parent node obtains the first data identifier;

a second transmission sub-module configured in the parent node, wherein when the parent node comprises the backward routing table pointing to the adjacent repository node, the second transmission sub-module is configured for, writing the first data identifier into the Set[BF Vector] of the farther node by the parent node, and transmitting the first data identifier to a next parent node of the parent node until the first data identifier reaches a root node of the index binary tree, so as to enable the parent node and the root node to establish a backward routing table comprising the first data identifier; and a third transmission sub-module configured in the parent node, wherein when the parent node does not comprise the backward routing table pointing to the adjacent repository node, the third transmission sub-module is configured for, writing the first data identifier into the Set[BF Vector] of the parent node by the ternary routing group of the parent node generated by the parent node based on the bloom filter, and transmitting the first data identifier to a next parent node of the parent node until the first data identifier reaches a root node of the index binary tree, so as to enable the parent node and the root node to establish a backward routing table comprising the first data identifier.

In one embodiment of the present application, the forward query module includes:

a fourth transmission sub-module configured in the query start node, wherein the fourth transmission sub-module is configured for, when no backward routing table is stored in the query start node, forwarding the query request to the superior farther node of the query start node in the index binary tree in turn according to the forward routing table, wherein the query request comprises the first data identifier and a node identifier of the query start node; and a fifth transmission sub-module configured in the parent node, wherein the fifth transmission sub-module is configured for, when the Set[BF Vector] in the parent node does not comprise the first data identifier, transmitting the query request to a next parent node until the query request reaches a parent node or a root node comprising the backward routing table with the first data identifier.

Compared with the prior art, the present application includes the following advantages:

In the embodiments of the present application, the P2P network is established on the basis of the DHT; the Kademlia algorithm is used to establish the forward routing table corresponding to each node in the P2P network; by regarding any node in the P2P network as a target node, the index binary tree may be established according to the logical distance between each node in the forward routing table and the target node, so that when a data entity of a digital object is stored in any node of the index binary tree, the first data identifier corresponding to the data entity may be transmitted from this node to the parent node of this node in turn until the first data identifier reaches the root node, so as to enable the root node and all the parent nodes that the first data identifier pass through to establish the backward routing table comprising the first data identifier; when any node in the index binary tree obtains the query request for the data entity, that is, in a state query stage, forward addressing is first performed on the basis of the forward routing table until a parent node or root node of the backward routing table comprising the first data identifier is queried; the parent node or root node of the backward routing table comprising the first data identifier may directly perform backward addressing according to the backward routing table until the data entity is found, and finally return the current status information of the data entity to the query start node. In the embodiments of the present application, bidirectional routing addressing is performed by means of establishing the Forward routing table and the backward routing table, so that decoupling of the data identifier of the data entity in the DHT-based P2P network from its storage position may be implemented on the basis of not increasing data addressing complexity; and the data entity of the digital object is allowed to be stored in any node in the P2P network, so that the digital object access efficiency may be improved while a spatial constraint of the digital object in the human-cyber-physical environment is satisfied.

BRIEF DESCRIPTION OF THE DRAWINGS

FIG. 2 is a flow chart of steps of a method for accessing a digital object in a human-cyber-physical environment in an embodiment of the present application;

Figure 1:
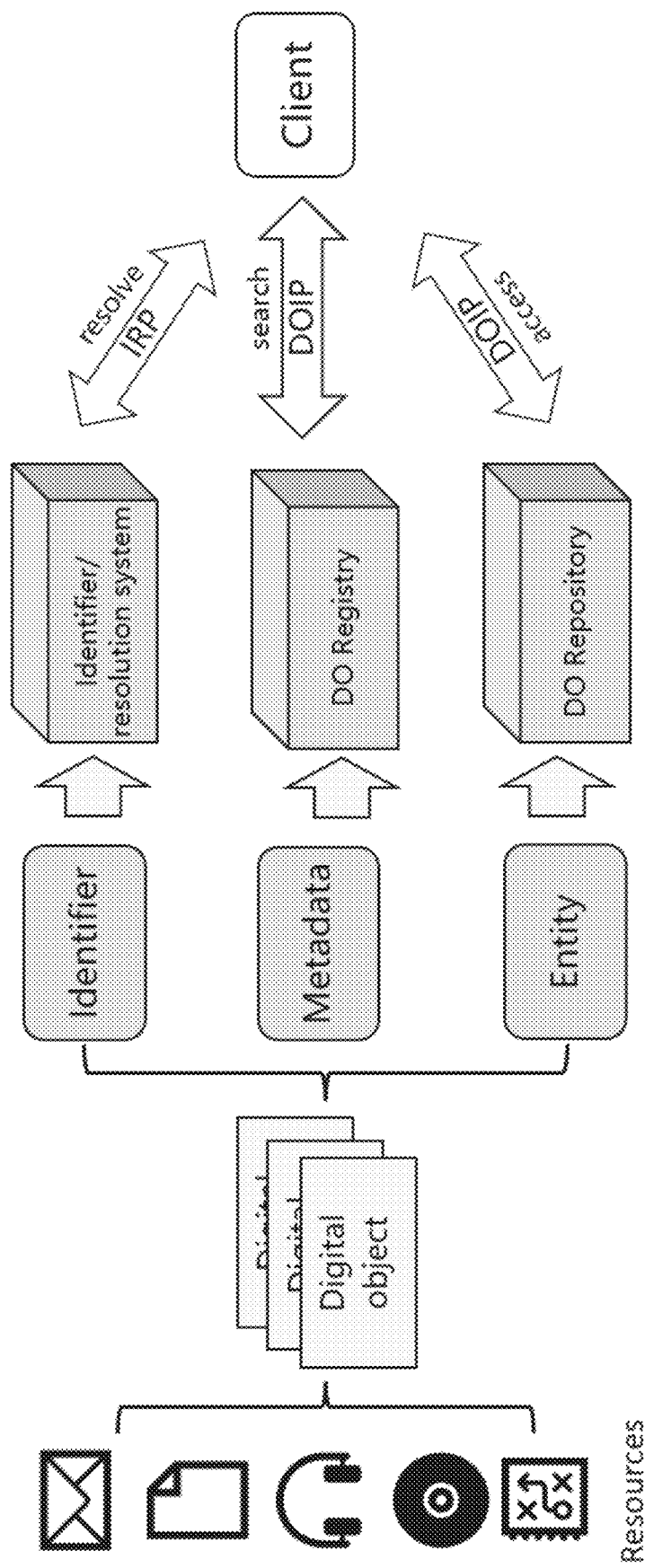
FIG. 1 is an overall architecture diagram of a DOA in an embodiment of the present application.

Reference numerals in the drawings, 600: system for accessing a digital object in a human-cyber-physical environment; 601: P2P network establishing module; 602: index binary tree establishing module; 603: first determination module; 604: backward routing table establishing module; 605: second determination module; 606: forward query module; 607: backward query module; and 608: information returning module.

DETAILED DESCRIPTION OF THE EMBODIMENTS

The technical solutions in the embodiments of the present invention will be clearly and completely described below with reference to the drawings in the embodiments of the present invention. Apparently, the described embodiments are only some but not all of the embodiments of the present invention. All other embodiments obtained by those of ordinary skill in the art without involving any creative effort based on the embodiments of the present invention shall fall in the scope of protection of the present invention.

It should be noted in this embodiment that, referring to FIG. 1, an overall structural diagram of a DOA is shown. An entire structure of the DOA is divided into two parts: a data model and an interaction model.

In terms of the data model, the DOA takes digital objects as basic elements in its structure, and the digital objects are abstract representations of resources. An identifier is a unique identity mark of a digital object. The identifier does not change with a storage environment, an access environment and content of the digital object. A complete digital object may be divided into three parts: description information, a data entity, and status information. The three parts are associated through the identifier of the digital object and point to a same logic digital object. The description information refers to metadata related to application and business of a digital object, and is configured for searching for the required digital object according to application requirements, such as: the use of the digital object and the classification of the digital object. The entity represents a practical content of the digital object, and is a real target of interoperation. The status information represents a current state of the digital object and is configured for finding and verifying the digital object, including: a storage location of the digital object, ownership information, and digital object Hash. A digital object of a music file is taken as an example. The description information of the music file includes a music name, an author, an album, a music style, and other information. The entity of the music file is a practical audio file, such as: xxx.mp3. The status information of the music file includes a practical storage location of the audio file, a practical owner of the audio file, and a Hash value of the content of the audio file, and other information. In a human-cyber-physical environment, digital objects may be used to abstract human-cyber-physical resources and provide a unified resource model, so as to shield the heterogeneity of the human-cyber-physical resources.

In terms of the interaction model, the DOA proposes three components for the three constituents of the digital object model: a digital object (DO) registry, a DO repository, and an identifier/resolution system, which are configured for managing the description information, the entity, and the status information, respectively. The DO registry is configured for managing the description information of the digital object, and provides index and search services of the digital object to the outside world. The index service takes the description information and the identifier of the digital object as inputs. The registry establishes an index of the digital object according to the input information. The search service retrieves the index of the digital object according to an input query keyword, and returns an identifier of a matching digital object. The DO repository actually stores the digital object, and provides an access service of the digital object to the outside world, including addition, deletion, modification, checking, and other behaviors for the digital object. The identifier/resolution system is in charge of managing status information of the digital object, providing identifier resolution services, and returning the status information of the digital object according to the identifier of a target digital object. In addition, the identifier/resolution system is further in charge of distributing identifiers to digital objects. The DOA also develops two standard protocols to standardize interaction behaviors with the three components, namely: a digital object interface protocol (DOIP) which interacts with the DO registry and the DO repository, and an identifier resolution protocol which interacts with the identifier/resolution system. The DOIP standardizes an access behavior to a digital object, and may be used to abstract and standardize an interoperation behavior of the human-cyber-physical resources in the human-cyber-physical environment, so as to reduce the complexity of the interoperation behavior.

In an Internet environment, digital objects are mainly generated in an information system, which are transformed from data, such as database tables, documents, and pictures, that have already existed in the information systems. For example, the most widely used digital object application DOI assigns unique identifiers for published papers and regards the papers as digital objects. In terms of digital object expression, in the existing DOA implementation, a digital object is regarded as a standard data serialization format and a minimum data unit. Data is formatted into two parts: an attribute and an element. The attribute expresses metadata, and practical data content is stored in an element field, and then the digital object will be assigned with a unique identifier and be uniquely stored in a certain DO repository. In terms of digital object access, the DO repository is generally dominated by a cloud server, and provides an access service to a digital object to the outside world through a unique network portal. A service address of a current repository where the digital object is located may be acquired according to identifier resolver status information of the digital object. The addition, deletion, modification, and checking of the digital objects are implemented through the DOIP. The way of accessing the DO repository is not fundamentally different from the way of accessing an existing object database. In terms of access permission management, a manager of the DO repository is also an owner of all digital objects stored locally, and has the permission to modify all the digital objects.

It may be seen that in the Internet environment, the digital object is an abstract expression of data of entities such as a database table, a document, and a picture in an Internet information system. Data is essentially a string of bit sequence and has the characteristics of mobility, reproducibility, and less static variations. Therefore, an access to data resource entities in the Internet environment may be effectively implemented on the basis of the DOA.

However, in the human-cyber-physical environment, human-cyber-physical digital objects are generated, stored, and consumed in spatially scattered terminal devices. A primary requirement for accessing the human-cyber-physical digital objects is to efficiently locate scattered target digital objects. Although a physical location of a cloud server in the Internet environment is not completely centralized, the cloud server may provide stable digital object access services in an information space due to its rich computing and network resources, so as to shield the scattering of the physical location. However, for the terminal devices, their physical space is more scattered, and no stable access entry may be provided because of resource constraints. As a main operating environment of the human-cyber-physical digital objects, the terminal device may not provide a stable access service to the human-cyber-physical digital objects.

At the same time, a P2P network based on a DHT is widely used in distributed storage due to its efficient data addressing method. In the DHT, each participating node will be assigned with a unique identifier, and information of some other nodes is recorded in a local routing table. The node determines, according to the local routing table, a next skip of node for message forwarding. In this way, the DHT may efficiently transmit a message to any target node in the whole network in a completely decentralized manner. Generally speaking, the DHT-based P2P storage may achieve nodes at a logarithmic level and data addressing complexity. A node where target data is located may be found from any node only through message routing for log N times, where N is the number of nodes in the network. Search of data in the DHT is also essentially search of nodes where the data is located. Therefore, in the traditional DHT, distances between the data and the nodes are generally defined, and the data is required to be stored on the nodes specified by its algorithm. Generally, the closest nodes may achieve data access at the O(log N) level.

However, the human-cyber-physical digital objects may not be physically spaced away from the terminal devices that generate the digital objects. On the one hand, the terminal device may not directly establish a routing relationship with any node like a P2P node of the Internet. Generally, the terminal device may only establish a connection with its adjacent mobile phones, gateways, and other devices through WIFI, Bluetooth, ZigBee, and other Internet of Things protocols. On the other hand, due to the timeliness and privacy of the human-cyber-physical digital objects, forcibly storing the human-cyber-physical digital objects to nodes far away from a production terminal may not guarantee that accessed digital objects are up-to-date, and has the risk of privacy leakage.

Based on the above-mentioned defects in the prior art, it is difficult for the existing DOA to effectively access any human-cyber-physical digital object in the scattered space in real time in the human-cyber-physical environment. Therefore, the embodiments of the present application aim to provide a method for accessing a digital object in a human-cyber-physical environment based on bidirectional routing, which implements the decoupling of the data identifiers of data entities from their storage locations in the DHT-based P2P network, thus allowing the data entities of the digital objects to be stored in any node in the whole network. A spatial constraint of the digital objects in the human-cyber-physical environment is satisfied, and the access efficiency at the O(log N) level may also be achieved.

Referring to FIG. 2, a method for accessing a digital object in a human-cyber-physical environment is shown. The method may include the following steps:

In step S101: establishing a P2P network on the basis of a DHT, wherein each node in the P2P network includes a node identifier corresponding to each of the nodes; using a Kademlia algorithm to establish a forward routing table corresponding to each of the nodes according to the node identifier.

In this embodiment, it should be noted that in the DHT-based P2P network, each participating node will be assigned with a unique identifier in the whole network, which is generally a hash value with a fixed length. In the Kademlia algorithm, each node is assigned with a node identifier $ID_{node}$ with a length of 160 bits, and at the same time, a distance d between nodes is defined to be XOR of the hash values of two nodes.

In the Kademlia algorithm, each node locally maintains a forward routing table. The forward routing table is composed of 160 K-buckets. Routing items of k other nodes are stored in each K-bucket. The routing item is represented in the form of $<ID_{node}, Address>$. When a new node is found, a local node $node_{local}$ places the new node to different K-buckets according to the distance from this node. Nodes with the distances in a range of [2i, 2i+1) are stored in an ith K-bucket. If the number of the routing items in the K-bucket exceeds k, the routing items that have not made a response to the node for the longest time are replaced. When a search message of a target node $node_{target}$ with a node identifier of $ID_{target}$ is received, $node_{local}$ will calculate a distance d ($node_{local}$, $node_{target}$) between $node_{local}$ and $ID_{target}$, and forward the message to α pieces of nodes that are closest to the target in the corresponding K-bucket, where α is the quantity of message forwarding nodes, which is also referred as message parallelism. According to an establishing rule of the K-bucket, the distance between a next skip of node $node_{next}$ and $node_{target}$ shall satisfy d ($node_{next}$, $node_{target}$) ≤d($node_{local}$, $node_{target}$)/2, that is, when the message is forwarded to the next skip of node $node_{next}$ at each time, the distance between the next skip of node $node_{next}$ and the target node $node_{target}$ will be reduced by a half at least, thus ensuring that messages in log N skips may be forwarded from any node to the target node. It should be noted that the message parallelism α may be increased to increase the number of adjacent nodes selected when nodes transmit messages, thus improving the query success rate and efficiency.

Due to the message is transmitted from a node farther away from the target node to a node closer to the target node in the forward routing table, Kademlia-based addressing may be referred as 'forward addressing' herein, and the Kademlia routing table of a node may be referred as 'forward routing table'.

In step S102: regarding any node in the P2P network as a target node, calculating a logical distance between each node in the forward routing table corresponding to the target node and the target node, and establishing an index binary tree according to the logical distance between each of the nodes and the target node.

It should be noted in this embodiment that when data entities of digital objects are stored in the nodes in the Kademlia-algorithm-based P2P, each data entity may also be assigned with a data identifier IDdata. The DHT may select K nodes that are closest to the data entity from the whole network according to the data identifier IDdata of the data entity data, and store K data copies into the K nodes, respectively. During data query, target data may be found only if a node with the smallest d (data, node) in the whole network is found. In this way, a query request of the DHT for the data entity may be regarded as searching for a node with the identifier of IDdata. The target data may be found by message routing for at most log N times from any node. In P2P storage, a message transmission delay between nodes is a main expense for data addressing, so that DHT-based P2P storage may greatly improve the data addressing efficiency. However, the data needs be stored in the closest node in the whole network according to its identifier due to the characteristic of the DHT, so it is impossible to store data entities on suitable nodes according to the heterogeneity of storage spaces, bandwidths, and availabilities of the nodes, resulting in that the data access efficiency often depends on weak nodes in a storage network. Therefore, in a DHT-based P2P storage network, the primary challenge to improve the data access efficiency is to achieve the decoupling between the data identifiers of the data entities and their storage locations.

In order to achieve the decoupling of the data identifiers of the data entities from their storage locations in the DHT-based P2P network, in this embodiment, a routing relationship between the nodes of the forward routing table is transformed into the form of an index binary tree on the basis of the distances between the target node and the respective nodes in the forward routing table. Specifically, step S102 may include the following specific sub-steps:

In sub-step S102-1: regarding any node in the P2P network as a target node, by taking any node in the P2P network as a target node, using the following exclusive OR (XOR) calculation formula to calculate a logical distance between each node in the forward routing table corresponding to the target node and the target node:

$$d(node1, node2) = ID_{node1} \oplus ID_{node2} \quad (1);$$

where node1 is the target node; $ID_{node1}$ is a node identifier of the target node; node2 is any node in the forward routing table, $ID_{node2}$ is a node identifier of any node in the forward routing table; and d(node1, node2) is the logical distance between the target node and the any node in the forward routing table.

In one example, $ID_{node1}$ is 00110, and $ID_{node2}$ is 00111, so d(node1, node2)=001 is obtained by calculation via the formula (1), that is, the logical distance between node1 and node2 is 1.

In sub-step S102-2: storing tree nodes of an ith layer of the index binary tree which are spaced apart from the target node at the logical distances in a range of $[2^{i-1}, 2^i)$ in an ascending or descending order according to the logical distance between each node and the target node, where i is a positive integer.

Figure 3:
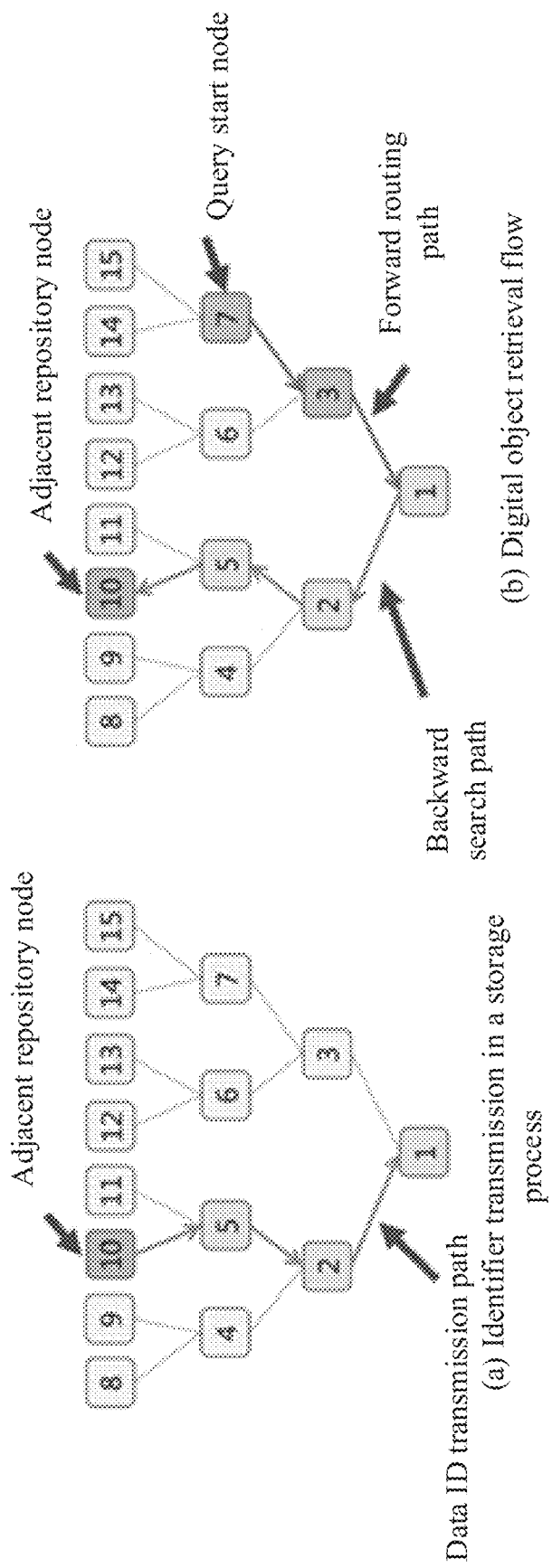
FIG. 3 is a schematic diagram of a bidirectional-routing-based digital object index in an embodiment of the present application.

Referring to FIG. 3, a schematic diagram of a bidirectional-routing-based digital object index in an embodiment of the present application is shown. A node network size shown in FIG. 3 is N=15.

Referring to FIG. 3(a) in FIG. 3, a root node of the index binary tree is the node closest to the target node in the whole network. The root node is at the first layer of the index binary tree; the second layer includes nodes that are spaced apart from the target node at the logical distances in a range of $[2^1, 2^2)$, that is, nodes that are spaced apart from the target node at distances of 2 and 3; the third layer includes nodes that are spaced apart from the target node at the logical distances in a range of $[2^2, 2^3)$, that is, nodes that are spaced apart from the target node at distances of 4, 5, 6, 7; and the like. After the nodes of all the layers are obtained, these nodes are arranged in an ascending or descending order, and the index binary tree is established in a direction from the farther nodes to closer nodes.

It should be noted that in practical applications, due to a possibility that some nodes may fail, the index binary tree is not necessarily a full tree. As shown in FIG. 3, if the node spaced apart from the target node at a distance of 5 fails, in a data addressing process, a node spaced apart from the target node at a distance of 10 may directly skip to a node spaced apart from the target node at a distance of 2. In this case, the data addressing will be faster. Or, if a node spaced apart from the target node at a distance of 1 fails, the distance between the node closest to the target node and the target node may be 2, 3, or at other distances.

Therefore, when the index binary tree is a full tree, it belongs to the 'worst case' situation, that is, a situation where the theoretical maximum number of skips are required to skip to the target node. Therefore, it should be understood that the index binary tree in FIG. 3 is only an example, and the specific structure of the tree is not specifically limited in this embodiment.

In step S103: when any node in the index binary tree obtains a data entity of a digital object, the node is determined as an adjacent repository node.

In this embodiment, since the DHT will select the k nodes that are closest to the data entity in the whole network according to the data identifier IDdata of the data entity data, and store k data copies in the k nodes, respectively, any node in the index binary tree may be used as the adjacent repository node for storing the data entity.

In step S104: generating a first data identifier for the data entity by the adjacent repository node, and transmitting the first data identifier to a parent node of the adjacent repository node in turn until the first data identifier reaches a root node of the index binary tree, so as to enable the parent node and the root node to establish a backward routing table comprising the first data identifier.

In this embodiment, continuing to refer to FIG. 3(b) in FIG. 3, a node spaced apart from the target node at a distance of 10 (hereinafter referred to as node 10) is taken as an example, and is regarded as the adjacent repository node for storing the data entity. In a data storage stage, the adjacent repository node may generate the first data identifier corresponding to the data entity, and transmit the first data identifier to the superior farther node, that is, to a node spaced apart from the target node at a distance of 5 (hereinafter referred to as node 5). Node 5 then transmits the first data identifier to a node spaced apart from the target node at a distance of 2 (hereinafter referred to as node 2) until the first data identifier reaches the root node, that is, the node spaced apart from the target node at a distance of 2, of the index binary tree, and until the first data identifier reaches the node spaced apart from the target node at a distance of 1 (hereinafter referred to as the root node).

In this way, when the root node receives a query request for a data entity corresponding to the first data identifier, the root node may know that the data entity exists in the routing table of node 2; node 2 knows that the data entity exists in the routing table of node 5; and node 5 knows that the data entity exists in the routing table of node 10, until a backward query is made to node 10, and finally, the desired data entity is found in node 10. Therefore, an addressing process of the backward routing table may be referred to as 'backward addressing'.

In step S105: when any node in the index binary tree obtains a query request for the data entity, determining the node as a query start node.

It should be noted that in this embodiment, any node in any index binary tree may be used as the start node of the query request.

In step S106: when no backward routing table is stored in the query start node, forwarding the query request to the superior farther node of the query start node in the index binary tree in turn until the query request reaches a farther node or a root node comprising the backward routing table with the first data identifier according to the forward routing table.

In this embodiment, addressing performed according to the addressing rules of the forward routing table is the forward addressing process, which specifically means that when the message is forwarded to a next skip of node $node_{next}$ at each time, the distance between the next skip of node $node_{next}$ and the target node $node_{target}$ will be reduced by a half at least. Referring to FIG. 3(b) in FIG. 3, a node spaced apart from the target at a distance of 7 (hereinafter referred to as node 7) is used as the query start node. According to the addressing rule of the forward routing table, node 7 may forward the query request to a node spaced apart from the target node at a distance of 3 (hereinafter referred to as node 3), and node 3 forwards the query request to the root node.

It should be noted in this embodiment that in the forward addressing process, it is queried that the root node is the 'worst case', that is, the situation where a large number of skips are required to skip to the root node. If the query start node is node 4, node 2 of the backward routing table comprising the first data identifier may be found by only one skip, and the backward addressing is started at node 2, without skipping to the root node.

It should be further stated in this embodiment that if a backward routing table happens to be stored in the query start node, for example, if the query start node is the root node, node 2, or node 5, the data entity corresponding to the first data identifier may be directly found according to the backward routing table.

In step S107: forwarding the query request to the adjacent repository node by the parent node comprising the backward routing table with the first data identifier, or by the root node according to the backward routing table.

In this embodiment, when the query request is forwarded to the farther node or the root node comprising the backward routing table for the first data identifier, the corresponding farther node or root node may directly find the data entity corresponding to the first data identifier according to the backward routing table. 8

In step S108: returning current status information of the data entity to the query start node according to the query request by the adjacent repository node.

In this embodiment, based on the index binary tree, the query request may inevitably reach the adjacent repository node in log N skips through the forward routing table and the backward routing table to achieve the access efficiency at the O(log N) level. The adjacent repository node returns the current status information of the data entity to the query start node according to the query request, so as to complete the state query for the data entity of the digital object.

In the embodiment of the present application, according to the method for accessing a digital object in a human-cyber-physical environment based on bidirectional routing, corresponding spatially scattered terminal devices are connected on the basis of the data entities configured for storing the digital objects of the P2P network that uses a P2P network architecture, thus establishing a human-cyber-physical digital object access environment. At the same time, by the constant-level multi-backup method for storing the k data copies to the k nodes, respectively, the data entities of the human-cyber-physical digital objects are backed up to a constant number of nodes, so as to ensure the high availability of digital object access; finally, the connection relationships between the nodes corresponding to the terminal devices are optimized by the DHT technology, and a digital object index algorithm is established through the bidirectional routing technology, thus achieving the decoupling of the data identifiers of the data entities in the DHT-based P2P network from their storage locations, allowing the data entities of the digital objects to be stored in any node in the P2P network, avoiding the risk of privacy leakage caused by storing the human-cyber-physical digital objects to the nodes far away from a production terminal, satisfying the spatial constraint to the digital objects in the human-cyber-physical environment, improving the digital object access efficiency, and ensuring that the accessed digital objects are up-to-date.

In one feasible implementation, step S104 may specifically include the following sub-steps:

In step S104-1: generating a backward routing table by the adjacent repository node based on a bloom filter, the backward routing table comprising a ternary routing group <$ID_{node}$, Address, Set[BF Vector]>, where $ID_{node}$ is a node identifier of the adjacent repository node; Address is a network address of the adjacent repository node; and Set[BF Vector] is a data identifier set comprised in the adjacent repository node.

It should be noted in this embodiment that the bloom filter is a binary vector data structure, and is also a random data structure with a simple structure and lower space complexity. The bloom filter is provided with higher spatial and temporal efficiency, and may accurately represent a set and answer decisions like 'whether element x is in set A'.

It should be noted that storing data identifier sets in routing items in a manner of vector sets on the basis of the Set[BF Vector] in the backward routing table generated by the bloom filter means that the bloom filter may be used to store all the data identifiers corresponding to a plurality of data entities to the Set[BF Vector] of the nodes, so that the storage and query requirements of the plurality of data entities are met simultaneously.

In sub-step S104-2: generating a first data identifier of the data entity by the adjacent repository node, writing the first data identifier into the Set[BF Vector] of the adjacent repository node, and transmitting the first data identifier to a parent node.

In sub-step S104-3: determining whether the parent node comprises a backward routing table pointing to the adjacent repository node when the parent node obtains the first data identifier.

In sub-step S104-4: if the parent node comprises the backward routing table pointing to the adjacent repository node, the parent node writes the first data identifier into the Set[BF Vector] of the farther node, and transmits the first data identifier to a next parent node of the parent node until the first data identifier reaches a root node of the index binary tree, so as to enable the parent node and the root node to establish a backward routing table comprising the first data identifier.

In sub-step S104-5: if the parent node does not comprise the backward routing table pointing to the adjacent repository node, writing the first data identifier into the Set[BF Vector] of the parent node by the ternary routing group of the parent node generated by the parent node based on the bloom filter, and transmitting the first data identifier to a next parent node of the parent node until the first data identifier reaches a root node of the index binary tree, so as to enable the parent node and the root node to establish a backward routing table comprising the first data identifier.

In this embodiment, each node that the first data identifier passes may generate one backward routing table on the basis of the bloom filter, and the backward routing table includes the ternary routing group <$ID_{node}$, Address, Set[BF Vector]>.

In one example, referring to FIG. 3(a), node 10 is used as the adjacent repository node. Node 10 may first generate the backward routing table on the basis of the bloom filter, write the first data identifier into the Set[BF Vector] of node 10, and transmit the first data identifier to node 5. Node 5 determines whether a routing item for node 10 is included. If the routing item for node 10 is included, it indicates that there is no need to establish a new ternary routing group, and the first data identifier is then directly written into the Set[BF Vector] of node 5 and is transmitted to node 2. If the routing item for node 10 is not included, after a new ternary routing group is generated, the first data identifier is written into the Set[BF Vector] of node 5 and is transmitted to node 2. Thus, it is ensured that the adjacent repository node where the data entity corresponding to the first data identifier is located may be inevitably backwardly queried through the backward routing table.

In this embodiment, since the storage overhead, storage complexity, and determination complexity of the bloom filter are at a constant level, the storage overhead of the backward routing table may also be reduced while the establishing requirement of the backward routing table is met.

It should be noted that although the bloom filter has a certain false positive fraction, that is, although it is probably possible to determine that an element that does not belong to a set belongs to the set, the false positive of the bloom filter does not affect the data addressing accuracy of this implementation. In the backward addressing process, if target data is in the backward routing table, an addressing message may be inevitably transmitted to an adjacent node that is closer to the data storage node, so the false positive fraction of the bloom filter does not affect a correct backward addressing path. The false positive of the bloom filter will cause that it is probably possible to forward the message to a wrong node, but it will only affect the complexity of the backward addressing, and skip will be stopped after 2 log N skips at most. Therefore, the backward routing table based on the bloom filter may still achieve the access efficiency at the O(log N) level even in the worst case.

In one feasible implementation, step S106 may include the following specific sub-steps:

In sub-step S106-1: when no backward routing table is stored in the query start node, forwarding the query request to the superior farther node of the query start node in the index binary tree in turn according to the forward routing table, wherein the query request comprises the first data identifier and a node identifier of the query start node.

In this embodiment, the node identifier of the query start node is written into the query request, and when the target data, i.e., the data entity corresponding to the first data identifier is found, status information of the data entity may be directly returned to the query start node.

In sub-step S106-2: when the Set[BF Vector] in the parent node does not include the first data identifier, the parent node transmits the query request to a next parent node until the query request reaches a parent node or root node of the backward routing table comprising the first data identifier.

In this embodiment, in the forward routing process, it is also determined on the basis of the bloom filter whether the first data identifier exists in the Set[BF Vector] of the parent node. If the first data identifier exists, it indicates that the backward routing table for the first data identifier exists in the parent node. In this case, the backward addressing is directly performed according to the backward routing table. If the first data identifier does not exist, transmission of the query request is continued to be performed to the root node.

Since the root node inevitably includes the backward routing table for the first data identifier, no matter which node is the query starting node, the backward routing table for the first data identifier may be queried eventually through a limited number of skips, and the backward routing is performed to access the data entities.

In this embodiment, an algorithm overhead of the method for accessing a digital object in a human-cyber-physical environment provided by the embodiment of the present application will be further analyzed to prove that the target data may be found from any node in this embodiment, and the time, storage, and network overheads are low.

Analysis of the addressing complexity: In the structured P2P network established on the basis of the Kademlia algorithm, a directed acyclic graph may be obtained for a certain piece of data. The establishing process of the backward routing table in this embodiment may be regarded as a routing process from any node to the root node, a maximum length of which is log N, so that the complexity of the backward routing table establishing algorithm is O(log N). The addressing flow for the digital entities may be divided into a forward stage and a backward stage. The forward stage is routing from any node to the root node, and the backward stage is a backward routing process from the root node along an edge of the directed acyclic graph, the maximum length of which is also log N, so the addressing complexity of this implementation is O(log N).

The impact of the false positive on the addressing efficiency: The false positive of the bloom filter will not affect the correctness and complexity of addressing, but only increase a certain number of redundant messages (transmitting the same message for multiple times means there are a plurality of messages). The reasonable setting of the false positive fraction may ensure that the redundant message volume caused by the false positive will not bring larger network overheads.

For a network with a node size of N, a node identifier includes at least log N bits, that is, each node needs to have log N K-buckets locally, and each K-bucket has at most k adjacent nodes, where k is the capacity of a node routing table, so it is obtained that the number of routing items in the forward routing table of each node is at most k×log N. Assuming that the connection relationships between the nodes are randomly established and the routing relationships in the forward routing table are uniformly distributed, the number of adjacent nodes included in the node backward routing table is also k×log N according to the symmetry principle. There is also a false positive fraction p, so the number of false positive addressing message forks that may be caused by each skip in the backward addressing process is expected to be kp×log N. All backward addressing will stop in log N skips; false positive messages generated at the first skip will undergo at most log N skips; false positive messages generated at the second skip will undergo at most log N−1 skips; and so on. Therefore, the maximum number of redundant messages caused by the false positive is expressed as the following formula:

$$R = kp \times \log N \times \sum_{i=1}^{\log N} i = kp \times \log^2 N (\log N + 1)/2$$

where R is the number of redundant messages; k is the capacity of the node routing table; p is the false positive fraction; and N is the node size.

For a Kademlia storage network with a node size of 1000 and a K-bucket capacity of 20, the false positive fraction is set to be 0.001, and the number of redundant messages generated in a single query due to the false positive in the backward routing table is at most about 10. In addition, redundant addressing caused by the false positive is parallel to a correct addressing path, so it does not affect the response time of the query.

The storage overhead of this implementation is mainly reflected in a space occupied by the bloom filter in the backward routing table. In this embodiment, by evaluating an average number of bloom filter vectors included in the backward routing table of each node under different network sizes N, data volumes M, and message parallelisms α, the storage overhead of this implementation is evaluated. Through simulation experiments, it is found that the average number of bloom filter vectors included in the backward routing table of each node increases as α and M increases, and finally tends to be stable. For example, for a storage network with N=1000 and α=3, when M reaches 10000, the average number of bloom filter vectors included in each node is about 60. Assuming that each bloom filter is expected to include 1000 elements and to have a false positive fraction of p=0.001, the storage space occupied by each bloom filter vector is expressed as the following formula:

$$S = 1000 \times \log_2 e \times \log_2 \frac{1}{0.001} \approx 14.4 \text{ Kbits}$$

Therefore, the average total overhead of the backward routing table of each node is only about 60*S=864 Kbits.

In conclusion, according to the method for accessing a digital object in a human-cyber-physical environment based on bidirectional routing provided in this embodiment, the decoupling of the data identifiers of the data entities from their storage locations is implemented on the basis of not increasing data addressing complexity, thus allowing the data entities of the digital objects to be stored in any node in the P2P network. The target data may be found from any node. Furthermore, the time, storage, and network overheads of this implementation are lower.

Figure 4:
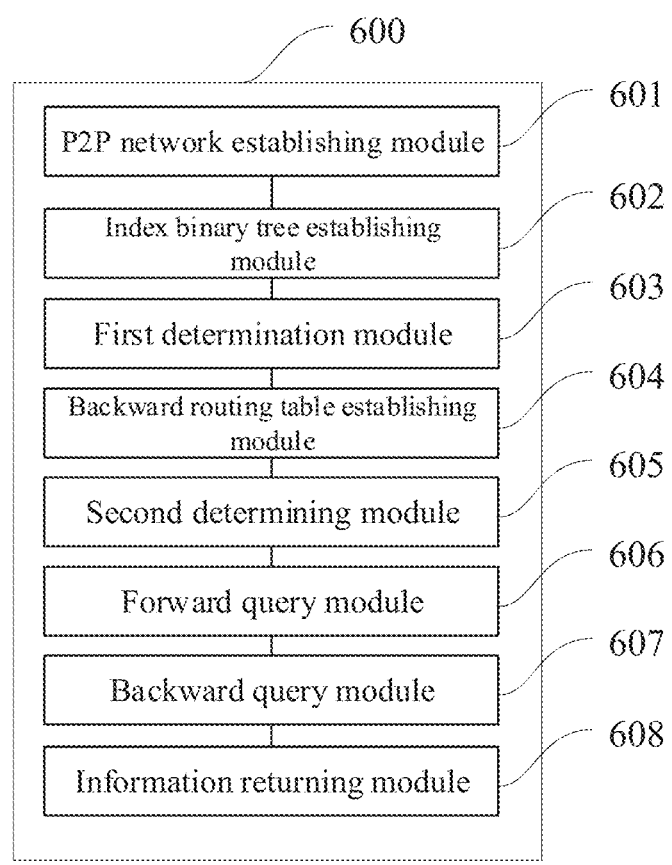
FIG. 4 is a schematic diagram of a connection relationship of a system for accessing a digital object in a human-cyber-physical environment in an embodiment of the present application.

In a second aspect, referring to FIG. 4, on the basis of the same inventive idea, an embodiment of the present application provides a system 600 for accessing a digital object in a human-cyber-physical environment, the system including:

a P2P network establishing module 601 is configured for, establishing a peer to peer (P2P) network on the basis of a distributed hash table (DHT), wherein each node in the P2P network comprises a node identifier corresponding to each of the nodes; using a Kademlia algorithm to establish a forward routing table corresponding to each of the nodes according to the node identifier;

an index binary tree establishing module 602 is configured for, regarding any node in the P2P network as a target node, calculating a logical distance between each node in the forward routing table corresponding to the target node and the target node, and establishing an index binary tree according to the logical distance between each of the nodes and the target node;

a first determination module 603 is configured for, when any node in the index binary tree obtains a data entity of a digital object, determining the node as an adjacent repository node;

a backward routing table establishing module 604 configured in the adjacent repository node, wherein the backward routing table establishing module 604 is configured for, generating a first data identifier for the data entity, and transmitting the first data identifier to a parent node of the adjacent repository node in turn until the first data identifier reaches a root node of the index binary tree, so as to enable the parent node and the root node to establish a backward routing table comprising the first data identifier;

a second determination module 605 is configured for, when any node in the index binary tree obtains a query request for the data entity, determining the node as a query start node;

a forward query module 606 configured in the query start node, wherein the forward query module is configured for, when no backward routing table is stored in the query start node, forwarding the query request to the superior farther node of the query start node in the index binary tree in turn until the query request reaches a farther node or a root node comprising the backward routing table with the first data identifier according to the forward routing table;

a backward query module 607 configured in the parent node or the root node comprising the backward routing table with the first data identifier, wherein the backward query module is configured for, forwarding the query request to the adjacent repository node according to the backward routing table; and an information returning module 608 configured in the adjacent repository node, wherein the information returning module is configured for, returning status information of the digital object returned by the adjacent repository node to the query request to the query start node.

In one embodiment of the present application, the index binary tree establishing module 602 further includes:

a distance calculation sub-module which uses the following XOR calculation formula to calculate a logical distance between each node in the forward routing table corresponding to the target node and the target node:

$$d(\text{node1}, \text{node2}) = ID_{node1} \oplus ID_{node2};$$

where node1 is the target node; $ID_{node1}$ is a node identifier of the target node; node2 is any node in the forward routing table; $ID_{node2}$ is a node identifier of any node in the forward routing table; and d(node1, node2) is the logical distance between the target node and the any node in the forward routing table.

In one embodiment of the present application, the index binary tree establishing module 602 further includes:

a tree building sub-module is configured for, storing tree nodes of an ith layer of the index binary tree which are spaced apart from the target node at the logical distances in a range of $[2^{i-1}, 2^i)$ in an ascending or descending order according to the logical distance between each node and the target node, where i is a positive integer.

In one embodiment of the present application, the backward routing table establishing module 604 includes:

a backward routing table generation sub-module configured in the adjacent repository node, wherein the backward routing table generation sub-module is configured for, generating a backward routing table by the adjacent repository node based on a bloom filter, the backward routing table comprising a ternary routing group <$ID_{node}$, Address, Set [BF Vector]>, where $ID_{node}$ is a node identifier of the adjacent repository node; Address is a network address of the adjacent repository node; and Set[BF Vector] is a data identifier set comprised in the adjacent repository node;

a first transmission sub-module configured in the adjacent repository node, wherein the first transmission sub-module is configured for, generating a first data identifier of the data entity by the adjacent repository node, writing the first data identifier into the Set[BF Vector] of the adjacent repository node, and transmitting the first data identifier to a parent node;

a determining sub-module is configured for, determining whether the parent node comprises a backward routing table pointing to the adjacent repository node when the parent node obtains the first data identifier;

a second transmission sub-module configured in the parent node, wherein when the parent node comprises the backward routing table pointing to the adjacent repository node, the second transmission sub-module is configured for, writing the first data identifier into the Set[BF Vector] of the farther node by the parent node, and transmitting the first data identifier to a next parent node of the parent node until the first data identifier reaches a root node of the index binary tree, so as to enable the parent node and the root node to establish a backward routing table comprising the first data identifier; and a third transmission sub-module configured in the parent node, wherein when the parent node does not comprise the backward routing table pointing to the adjacent repository node, the third transmission sub-module is configured for, writing the first data identifier into the Set[BF Vector] of the parent node by the ternary routing group of the parent node generated by the parent node based on the bloom filter, and transmitting the first data identifier to a next parent node of the parent node until the first data identifier reaches a root node of the index binary tree, so as to enable the parent node and the root node to establish a backward routing table comprising the first data identifier.

In one embodiment of the present application, the forward query module 606 includes:

a fourth transmission sub-module configured in the query start node, wherein the fourth transmission sub-module is configured for, when no backward routing table is stored in the query start node, forwarding the query request to the superior farther node of the query start node in the index binary tree in turn according to the forward routing table, wherein the query request comprises the first data identifier and a node identifier of the query start node; and a second determining sub-module is configured for, determining whether the Set[BF Vector] in the parent node includes the first data identifier;

a fifth transmission sub-module configured in the parent node, wherein the fifth transmission sub-module is configured for, when the Set[BF Vector] in the parent node does not comprise the first data identifier, transmitting the query request to a next parent node until the query request reaches a parent node or a root node comprising the backward routing table with the first data identifier;

a sixth transmission sub-module configured in the parent node, wherein the sixth transmission is configured for, when the Set[BF Vector] in the parent node does not include the first data identifier, transmitting the query request to a next parent node of the parent node until the query request reaches a parent node or root node of the backward routing table comprising the first data identifier.

It should be noted that the specific embodiments of the system 600 for accessing a digital object in a human-cyber-physical environment of the embodiment of the present application may refer to the specific embodiments of the method for accessing a digital object in a human-cyber-physical environment of the embodiment of the present application, and will not be repeated here.

Those skilled in the art should understand that the embodiments of the present invention may provide a method, an apparatus, or a computer program product. Therefore, the embodiments of the present invention may adopt the form of a complete hardware embodiment, a complete software embodiment, or a software and hardware combination embodiment. In addition, the embodiments of the present invention may adopt the form of a computer program product implemented on one or multiple computer-sensitive storage media (including, but not limited to, a magnetic disk memory, a Compact Disc Read-Only Memory (CD-ROM), an optical memory and the like) including computer-sensitive program codes.

The embodiments of the present invention are described by referring to flow charts and/or block diagrams of methods, devices (systems) and computer program products according to the embodiments of the present invention. It is worthwhile to note that computer program instructions may be used to implement each flow and/or each block in the flow charts and/or the block diagrams and a combination of a flow and/or a block in the flowcharts and/or the block diagrams. These computer program instructions may be provided for a general computer, a dedicated computer, an embedded CPU or processing units of other programmable data processing terminal devices to generate a machine, thereby making the instructions that are executed by the computer or the processing units of other programmable data processing terminal devices generate apparatuses for realizing specified functions in one or more flows in the flow charts and/or one or more blocks of the block diagrams.

These computer program instructions may also be stored in a computer-readable memory that may instruct the computer or another programmable data processing terminal device to work in a specific way, so that the instructions stored in the computer-readable memory generate a product that includes an instruction apparatus. The instruction apparatus implements a specified function in one or more flows in the flow charts and/or in one or more blocks in the block diagrams.

These computer program instructions may also be loaded onto the computer or another programmable data processing device, so that a series of operations and steps are performed on the computer or another programmable terminal device, thereby generating computer-implemented processing. Therefore, the instructions executed on the computer or the another programmable terminal device provide steps for implementing a specified function in one or more flows in the flow charts and/or in one or more blocks in the block diagrams.

Although the preferred embodiments of the present invention have been described, those skilled in the art may make other changes and modifications to these embodiments once they acquire the basic creative concept. Therefore, attached claims are intended to be explained as including the preferred embodiments and all the changes and modifications that fall in the scope of the embodiments of the present invention.

It should also be finally noted that in this context, the relational terms 'first', 'second', and the like are used merely to distinguish one entity or operation from another entity or operation, instead of necessarily requiring or implying that these entities or operations have any of these practical relationships or orders. Furthermore, the terms 'include', 'include' or any other variants are meant to cover non-exclusive inclusions, so that a process, method, object or terminal device that includes a series of elements not only includes those elements, but also includes other elements which are not definitely listed, or further includes inherent elements of this process, method, object or terminal device. Without more restrictions, elements defined by the phrase 'includes a/an . . . ' do not exclude that the process, method, object, or terminal device that includes the elements still includes other identical elements.

The method and system for accessing a digital object in a human-cyber-physical environment provided in the present invention have been described above in detail. Specific examples are used herein to illustrate the principle and implementations of the present invention. The descriptions of the above embodiments are only used to help understand the method and its core idea of the present invention.

Moreover, for those of ordinary skill in the art, according to the idea of the present invention, there will be changes in the specific implementation and the scope of application. In summary, the content of this specification should not be construed as limiting the present invention.

The invention claimed is:

1. A method for accessing a digital object in a human-cyber-physical environment, wherein the method comprises:

establishing a peer to peer (P2P) network on the basis of a distributed hash table (DHT), wherein each node of a plurality of nodes in the P2P network comprises a node identifier corresponding to each node; using a Kademlia algorithm to establish a forward routing table corresponding to each node according to the node identifier;

regarding any node of the plurality of nodes in the P2P network as a target node, calculating a logical distance between each node in the forward routing table corresponding to the target node and the target node, and establishing an index binary tree according to the logical distance between each node in the forward routing table corresponding to the target node and the target node;

when a first node in the index binary tree obtains a data entity of a digital object, determining the first node as an adjacent repository node;

generating a first data identifier for the data entity by the adjacent repository node, and transmitting the first data identifier to a parent node of the adjacent repository node in turn until the first data identifier reaches a root node of the index binary tree, and upon receiving the first data identifier, the parent node and the root node establish a backward routing table comprising the first data identifier;

when a second node in the index binary tree obtains a query request for the data entity, determining the second node as a query start node;

when no backward routing table is stored in the query start node, forwarding the query request to a parent node of the query start node in the index binary tree in turn until the query request reaches a parent node or a root node comprising the backward routing table with the first data identifier according to the forward routing table;

forwarding the query request to the adjacent repository node by the parent node comprising the backward routing table with the first data identifier, or by the root node according to the backward routing table; and returning, by the adjacent repository node, current status information of the data entity to the query start node according to the query request;

wherein the step of regarding any node in the P2P network as the target node, calculating the logical distance between each node in the forward routing table corresponding to the target node and the target node comprises:

using an exclusive OR (XOR) calculation formula to calculate a logical distance between each node in the forward routing table corresponding to the target node and the target node, and the exclusive OR (XOR) calculation formula is:

$$d(node1, node2) = ID_{node1} \oplus ID_{node2};$$

where node1 is the target node; $ID_{node1}$ is a node identifier of the target node; node2 is any node in the forward routing table; $ID_{node2}$ is a node identifier of any node in the forward routing table; and d(node1, node2) is the logical distance between the target node and the any node in the forward routing table.

2. The method according to claim 1, wherein the step of generating the first data identifier for the data entity by the adjacent repository node, and transmitting the first data identifier to the parent node of the adjacent repository node in turn until the first data identifier reaches the root node of the index binary tree, and upon receiving the first data identifier, the parent node and the root node establish the backward routing table comprising the first data identifier comprises:

generating the backward routing table by the adjacent repository node based on a bloom filter, the backward routing table comprising a ternary routing group <$ID_{node}$, Address, Set[BF Vector]>, where $ID_{node}$ is a node identifier of the adjacent repository node; Address is a network address of the adjacent repository node; and Set[BF Vector] is a data identifier set comprised in the adjacent repository node;

generating the first data identifier of the data entity by the adjacent repository node, writing the first data identifier into the Set[BF Vector] of the adjacent repository node, and transmitting the first data identifier to the parent node of the adjacent repository node;

determining whether the parent node comprises the backward routing table pointing to the adjacent repository node when the parent node obtains the first data identifier;

when the parent node comprises the backward routing table pointing to the adjacent repository node, writing the first data identifier into the Set[BF Vector] of the parent node by the parent node, and transmitting the first data identifier to a next parent node of the parent node until the first data identifier reaches the root node of the index binary tree, and upon receiving the first data identifier, the parent node and the root node establish the backward routing table comprising the first data identifier; and when the parent node does not comprise the backward routing table pointing to the adjacent repository node, writing the first data identifier into the Set[BF Vector] of the parent node by the ternary routing group of the parent node generated by the parent node based on the bloom filter, and transmitting the first data identifier to the next parent node of the parent node until the first data identifier reaches the root node of the index binary tree, and upon receiving the first data identifier, the parent node and the root node establish a backward routing table comprising the first data identifier.

3. The method according to claim 2, wherein the step of when no backward routing table is stored in the query start node, forwarding the query request to the parent node of the query start node in the index binary tree in turn until the query request reaches the parent node or the root node comprising the backward routing table with the first data identifier according to the forward routing table comprises:

when no backward routing table is stored in the query start node, forwarding the query request to the parent node of the query start node in the index binary tree in turn according to the forward routing table, wherein the query request comprises the first data identifier and a node identifier of the query start node;

when the Set[BF Vector] in the parent node does not comprise the first data identifier, transmitting the query request to the next parent node until the query request reaches the parent node or the root node comprising the backward routing table with the first data identifier by the parent node.

4. A method for accessing a digital object in a human-cyber-physical environment wherein the method comprises:
establishing a peer to peer (P2P) network on the basis of a distributed hash table (DHT), wherein each node of a plurality of nodes in the P2P network comprises a node identifier corresponding to each node; using a Kademlia algorithm to establish a forward routing table corresponding to each node according to the node identifier;
regarding any node of the plurality of nodes in the P2P network as a target node, calculating a logical distance between each node in the forward routing table corresponding to the target node and the target node, and establishing an index binary tree according to the logical distance between each node in the forward routing table corresponding to the target node and the target node;
when a first node in the index binary tree obtains a data entity of a digital object, determining the first node as an adjacent repository node;
generating a first data identifier for the data entity by the adjacent repository node, and transmitting the first data identifier to a parent node of the adjacent repository node in turn until the first data identifier reaches a root node of the index binary tree, and upon receiving the first data identifier, the parent node and the root node establish a backward routing table comprising the first data identifier;
when a second node in the index binary tree obtains a query request for the data entity, determining the second node as a query start node;
when no backward routing table is stored in the query start node, forwarding the query request to a parent node of the query start node in the index binary tree in turn until the query request reaches a parent node or a root node comprising the backward routing table with the first data identifier according to the forward routing table;
forwarding the query request to the adjacent repository node by the parent node comprising the backward routing table with the first data identifier, or by the root node according to the backward routing table; and
returning, by the adjacent repository node, current status information of the data entity to the query start node according to the query request;
wherein the step of establishing the index binary tree according to the logical distance between each node in the forward routing table corresponding to the target node and the target node comprises:
storing tree nodes of an $i^{th}$ layer of the index binary tree in an ascending or descending order according to the logical distance between each node and the target node, wherein the tree nodes are spaced apart from the target node at the logical distances in a range of $[2^{i-1}, 2^i)$, where i is a positive integer.

5. The method according to claim 4, wherein the step of generating the first data identifier for the data entity by the adjacent repository node, and transmitting the first data identifier to the parent node of the adjacent repository node in turn until the first data identifier reaches the root node of the index binary tree, and upon receiving the first data identifier, the parent node and the root node establish the backward routing table comprising the first data identifier comprises:

generating the backward routing table by the adjacent repository node based on a bloom filter, the backward routing table comprising a ternary routing group <$ID_{node}$, Address, Set[BF Vector]>, where $ID_{node}$ is a node identifier of the adjacent repository node; Address is a network address of the adjacent repository node; and Set[BF Vector] is a data identifier set comprised in the adjacent repository node;
generating the first data identifier of the data entity by the adjacent repository node, writing the first data identifier into the Set[BF Vector] of the adjacent repository node, and transmitting the first data identifier to the parent node of the adjacent repository node;
determining whether the parent node comprises the backward routing table pointing to the adjacent repository node when the parent node obtains the first data identifier;
when the parent node comprises the backward routing table pointing to the adjacent repository node, writing the first data identifier into the Set[BF Vector] of the parent node by the parent node, and transmitting the first data identifier to a next parent node of the parent node until the first data identifier reaches the root node of the index binary tree, and upon receiving the first data identifier, the parent node and the root node establish the backward routing table comprising the first data identifier; and
when the parent node does not comprise the backward routing table pointing to the adjacent repository node, writing the first data identifier into the Set[BF Vector] of the parent node by the ternary routing group of the parent node generated by the parent node based on the bloom filter, and transmitting the first data identifier to the next parent node of the parent node until the first data identifier reaches the root node of the index binary tree, and upon receiving the first data identifier, the parent node and the root node establish a backward routing table comprising the first data identifier.

6. The method according to claim 5, wherein the step of when no backward routing table is stored in the query start node, forwarding the query request to the parent node of the query start node in the index binary tree in turn until the query request reaches the parent node or the root node comprising the backward routing table with the first data identifier according to the forward routing table comprises:
when no backward routing table is stored in the query start node, forwarding the query request to the parent node of the query start node in the index binary tree in turn according to the forward routing table, wherein the query request comprises the first data identifier and a node identifier of the query start node;
when the Set[BF Vector] in the parent node does not comprise the first data identifier, transmitting the query request to the next parent node until the query request reaches the parent node or the root node comprising the backward routing table with the first data identifier by the parent node.

7. An electronic device configured for accessing a digital object in a human-cyber-physical environment, wherein the electronic device comprises:
a memory, wherein a computer-readable code is stored in the memory; and
one or more processors, wherein when the computer-readable code is executed by the one or more processors, the electronic device executes a method for accessing a digital object in a human-cyber-physical environment, and the method comprises:

establishing a peer to peer (P2P) network on the basis of a distributed hash table (DHT), wherein each node of a plurality of nodes in the P2P network comprises a node identifier corresponding to each node; using a Kademlia algorithm to establish a forward routing table corresponding to each node according to the node identifier;

regarding any node of the plurality of nodes in the P2P network as a target node, calculating a logical distance between each node in the forward routing table corresponding to the target node and the target node, and establishing an index binary tree according to the logical distance between each node in the forward routing table corresponding to the target node and the target node;

when a first node in the index binary tree obtains a data entity of a digital object, determining the first node as an adjacent repository node;

generating a first data identifier for the data entity by the adjacent repository node, and transmitting the first data identifier to a parent node of the adjacent repository node in turn until the first data identifier reaches a root node of the index binary tree, and upon receiving the first data identifier, the parent node and the root node establish a backward routing table comprising the first data identifier;

when a second node in the index binary tree obtains a query request for the data entity, determining the second node as a query start node;

when no backward routing table is stored in the query start node, forwarding the query request to a parent node of the query start node in the index binary tree in turn until the query request reaches a parent node or a root node comprising the backward routing table with the first data identifier according to the forward routing table;

forwarding the query request to the adjacent repository node by the parent node comprising the backward routing table with the first data identifier, or by the root node according to the backward routing table; and returning, by the adjacent repository node, current status information of the data entity to the query start node according to the query request;

wherein the step of regarding any node in the P2P network as the target node, calculating the logical distance between each node in the forward routing table corresponding to the target node and the target node comprises:

using an XOR calculation formula to calculate a logical distance between each node in the forward routing table corresponding to the target node and the target node, and the exclusive OR (XOR) calculation formula is:

$$d(node1, node2) = ID_{node1} \oplus ID_{node2};$$

where node1 is the target node; $ID_{node1}$ is a node identifier of the target node; node2 is any node in the forward routing table; $ID_{node2}$ is a node identifier of any node in the forward routing table; and d(node1, node2) is the logical distance between the target node and the any node in the forward routing table.

8. The electronic device according to claim 7, wherein the step of establishing the index binary tree according to the logical distance between each node in the forward routing table corresponding to the target node and the target node comprises:

storing tree nodes of an $i^{th}$ layer of the index binary tree in an ascending or descending order according to the logical distance between each node and the target node, wherein the tree nodes are spaced apart from the target node at the logical distances in a range of $[2^{i-1}, 2^i)$, where i is a positive integer.

9. The electronic device according to claim 7, wherein the step of generating the first data identifier for the data entity by the adjacent repository node, and transmitting the first data identifier to the parent node of the adjacent repository node in turn until the first data identifier reaches the root node of the index binary tree, and upon receiving the first data identifier, the parent node and the root node establish the backward routing table comprising the first data identifier comprises:

generating the backward routing table by the adjacent repository node based on a bloom filter, the backward routing table comprising a ternary routing group <$ID_{node}$, Address, Set[BF Vector]>, where $ID_{node}$ is a node identifier of the adjacent repository node; Address is a network address of the adjacent repository node; and Set[BF Vector] is a data identifier set comprised in the adjacent repository node;

generating the first data identifier of the data entity by the adjacent repository node, writing the first data identifier into the Set[BF Vector] of the adjacent repository node, and transmitting the first data identifier to the parent node of the adjacent repository node;

determining whether the parent node comprises a backward routing table pointing to the adjacent repository node when the parent node obtains the first data identifier;

when the parent node comprises the backward routing table pointing to the adjacent repository node, writing the first data identifier into the Set[BF Vector] of the parent node by the parent node, and transmitting the first data identifier to a next parent node of the parent node until the first data identifier reaches the root node of the index binary tree, and upon receiving the first data identifier, the parent node and the root node to establish the backward routing table comprising the first data identifier; and when the parent node does not comprise the backward routing table pointing to the adjacent repository node, writing the first data identifier into the Set[BF Vector] of the parent node by the ternary routing group of the parent node generated by the parent node based on the bloom filter, and transmitting the first data identifier to the next parent node of the parent node until the first data identifier reaches the root node of the index binary tree, and upon receiving the first data identifier, the parent node and the root node to establish the backward routing table comprising the first data identifier.

10. The electronic device according to claim 9, wherein the step of when no backward routing table is stored in the query start node, forwarding the query request to the parent node of the query start node in the index binary tree in turn until the query request reaches the parent node or the root node comprising the backward routing table with the first data identifier according to the forward routing table comprises:

when no backward routing table is stored in the query start node, forwarding the query request to the parent node of the query start node in the index binary tree in turn according to the forward routing table, wherein the query request comprises the first data identifier and the node identifier of the query start node; and when the Set[BF Vector] in the parent node does not comprise the first data identifier, transmitting the query request to the next parent node until the query request reaches the parent node or the root node comprising the backward routing table with the first data identifier.

\* \* \* \* \*